US012806756B2

(12) United States Patent
Craig et al.

(10) Patent No.: US 12,806,756 B2
(45) Date of Patent: Nov. 24, 2026

(54) ACCESSORY FOR POWER TOOL

(71) Applicant: MILWAUKEE ELECTRIC TOOL CORPORATION, Brookfield, WI (US)

(72) Inventors: Kentez L. Craig, Milwaukee, WI (US); Benjamin J. Farley, Milwaukee, WI (US); Hugh A. Dales, Germantown, WI (US); Peter W. Malak, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 575 days.

(21) Appl. No.: 18/143,362

(22) Filed: May 4, 2023

(65) Prior Publication Data

US 2023/0364771 A1 Nov. 16, 2023

Related U.S. Application Data

(60) Provisional application No. 63/340,559, filed on May 11, 2022.

(51) Int. Cl.
*B25F 5/02* (2006.01)
*B25H 3/00* (2006.01)

(52) U.S. Cl.
CPC ............... *B25F 5/029* (2013.01); *B25H 3/00* (2013.01); *B25H 3/003* (2013.01)

(58) Field of Classification Search
CPC ............ B25F 5/029; B25H 3/003; B25H 3/00
USPC ............................................. 211/69; 248/200
See application file for complete search history.

(56) References Cited

U.S. PATENT DOCUMENTS

| | | | | | |
|---|---|---|---|---|---|
| 3,743,147 | A * | 7/1973 | Wilczynski | A45F 5/021 | 224/199 |
| 4,419,794 | A * | 12/1983 | Horton, Jr. | A45F 5/02 | 24/669 |
| 4,954,026 | A * | 9/1990 | Zurwelle | B23B 45/006 | 206/373 |
| 5,056,661 | A * | 10/1991 | Balzano | B25F 5/029 | D3/304 |
| 5,188,242 | A * | 2/1993 | Smith | B25F 5/029 | 248/205.3 |
| 6,112,897 | A * | 9/2000 | Hu | B25H 3/003 | 206/480 |

(Continued)

FOREIGN PATENT DOCUMENTS

| | | | | |
|---|---|---|---|---|
| CA | 2076227 A1 | 2/1994 | | |
| DE | 20303380 U1 * | 5/2003 | | B25H 3/003 |

(Continued)

OTHER PUBLICATIONS

Extended European Search Report for Application No. 23172256.2 dated Sep. 19, 2023 (8 pages).

*Primary Examiner* — Taylor Morris
(74) *Attorney, Agent, or Firm* — Michael Best & Friedrich LLP

(57) ABSTRACT

A bit holder configured to engage a power tool. The bit holder including a mounting element and a bit holding portion. The mounting element is configured to alternately engage a first mounting structure on a first side of the power tool and a second mounting structure on a second side of the power tool. The bit holding portion includes a bit retaining aperture configured to at least partially receive a bit to secure the bit to the power tool.

17 Claims, 13 Drawing Sheets

(56) References Cited

U.S. PATENT DOCUMENTS 6,702,530 B2 * 3/2004 Bennage ................. B25F 5/029 408/241 R
6,964,545 B1 * 11/2005 Languasco .............. B25F 5/029 362/120
7,591,616 B1 * 9/2009 Kerner .................... B25F 5/029 408/124
9,701,008 B2 * 7/2017 Cho ........................ B25F 5/029
10,315,256 B1 * 6/2019 Stephenson, Jr. ......... B25F 5/02
11,819,112 B1 * 11/2023 Daniels ................... A45F 5/021
12,257,689 B1 * 3/2025 Verellen ................. B25G 1/085
12,544,905 B2 * 2/2026 Fischer .................. B25H 3/003
2002/0110431 A1 8/2002 Dils et al.
2004/0079662 A1 * 4/2004 Wang ..................... B25H 3/003 206/378
2005/0069391 A1 * 3/2005 Dils ......................... G01V 3/15 408/16
2006/0022002 A1 * 2/2006 Marks ....................... A45F 5/00 224/268
2006/0065557 A1 * 3/2006 Brunson ................ B25H 3/003 206/273
2006/0104735 A1 * 5/2006 Zeiler ..................... B25F 5/021 173/217
2007/0138041 A1 * 6/2007 Welsh ...................... B25H 3/02 206/349
2007/0138233 A1 * 6/2007 Yang ...................... B25H 3/006 227/156
2007/0175785 A1 8/2007 Sharp
2007/0227310 A1 * 10/2007 Roehm ................... B25B 21/00 173/2
2007/0241159 A1 * 10/2007 Chang ....................... A45F 5/02 224/904
2008/0032190 A1 * 2/2008 Furuta ................. H01M 50/244 429/163
2008/0251402 A1 * 10/2008 Chiu ...................... B25H 3/003 206/377
2009/0188823 A1 * 7/2009 Zwergius ............... B25H 3/003 206/379
2010/0072094 A1 * 3/2010 Taylor .................... B25H 3/003 206/372
2011/0031145 A1 * 2/2011 Larson ................... B25H 3/003 206/372
2011/0062296 A1 3/2011 Brauer
2011/0226713 A1 * 9/2011 Su .......................... B25H 3/003 211/70.6
2013/0098792 A1 * 4/2013 Liu ........................ B25H 3/022 206/349
2013/0118939 A1 * 5/2013 Meyers .................. B25H 3/003 206/374
2013/0161915 A1 * 6/2013 Johnson .............. B25B 23/0028 279/142
2016/0167219 A1 6/2016 Cho
2017/0259422 A1 * 9/2017 Takeyama ............... B25F 5/029
2017/0282351 A1 * 10/2017 Da Rosa ................ B25H 3/003
2018/0154509 A1 6/2018 Sergyeyenko et al.
2019/0168376 A1 * 6/2019 Brocket ................. B25H 3/021
2020/0055176 A1 2/2020 Curchod
2020/0238481 A1 * 7/2020 Khan ...................... B25B 13/46
2020/0253364 A1 * 8/2020 Myers .................... B25H 3/006
2021/0237253 A1 * 8/2021 Moss ...................... B25B 21/00
2022/0331943 A1 * 10/2022 Babaian .................. B25F 5/029
2025/0196312 A1 * 6/2025 Anderson ............... B23B 45/02

FOREIGN PATENT DOCUMENTS

DE 202008010583 U1 * 10/2008 ............. B25H 3/003
DE 202010009068 U1 * 10/2010 ............. B25H 3/003
DE 202011051826 U1 * 1/2012 ............. B25H 3/003
DE 202012011368 U1 * 3/2014 .............. B25F 5/029
DE 202015100562 U1 * 5/2016 ............. B25H 3/003
DE 202017104787 U1 * 9/2017 ............. B25H 3/006
DE 202021002628 U1 * 11/2021 ............. B25H 3/003
DE 102022107270 A1 * 9/2023 ............. B25H 3/003
EP 4299256 A1 * 1/2024 ............. B25H 3/003
GB 2444261 A * 6/2008 ........... A45F 5/1566
GB 2522203 A * 7/2015 ............... B25H 3/02

* cited by examiner

ACCESSORY FOR POWER TOOL

CROSS-REFERENCE TO RELATED APPLICATION

This application claims priority to U.S. Provisional Patent Application No. 63/340,559, filed May 11, 2022, the entire content of which is incorporated herein by reference.

FIELD OF THE INVENTION

The present disclosure relates to accessories for power tools, and more specifically, to bit holders for use with power tools.

BACKGROUND OF THE INVENTION

Some power tools such as drills are configured to be selectively connected with tool bits. Typically, tool bits not in use with the power tool are stored at a remote location. Typically, one tool bit is attached to a chuck prior to operation of the power tool. Depending on use of the power tool, different tool bits may be secured to the chuck.

SUMMARY OF THE INVENTION

The invention provides, in one aspect, a bit holder configured to engage a power tool. The bit holder comprises a mounting element configured to alternately engage a first mounting structure on a first side of the power tool and a second mounting structure on a second side of the power tool. The bit holder further comprises a bit holding portion including a bit retaining aperture configured to at least partially receive a bit to secure the bit to the power tool.

The invention provides, in another aspect, a bit holder assembly for use with a first power tool having a first mounting structure and a second power tool having a second mounting structure that is different than the first mounting structure. The bit holder assembly comprises a bit holder and an adapter. The bit holder includes a holder mounting element and a bit holding portion including a bit retaining aperture configured to at least partially receive a bit. The adapter includes an adapter mounting element and an aperture. The bit holder is configured to be removably coupled to the first power tool with the holder mounting element in engagement with the first mounting structure. The bit holder is configured to be removably coupled to the second power tool with the holder mounting element in engagement with the aperture and the adapter mounting element in engagement with the second mounting structure.

The invention provides, in another aspect, a bit holder configured to engage a power tool. The bit holder comprises a mounting element and a bit holding portion. The mounting element is configured to removably engage a mounting structure of the power tool. The bit holding portion has a first side, a second side opposite the first side, and a span extending between the first side and the second side to form an arch. The bit holding portion defines a cavity bounded by the first side, the second side, and the span. The bit holding portion also defines a bit retaining aperture in communication with the cavity and configured to at least partially receive a bit to secure the bit to the power tool.

Other aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. Also, it is to be understood that the phraseology and terminology used herein is for the purpose of description and should not be regarded as limiting. The invention is capable of other embodiments and of being practiced or of being carried out in various ways.

DETAILED DESCRIPTION

Figure 1:
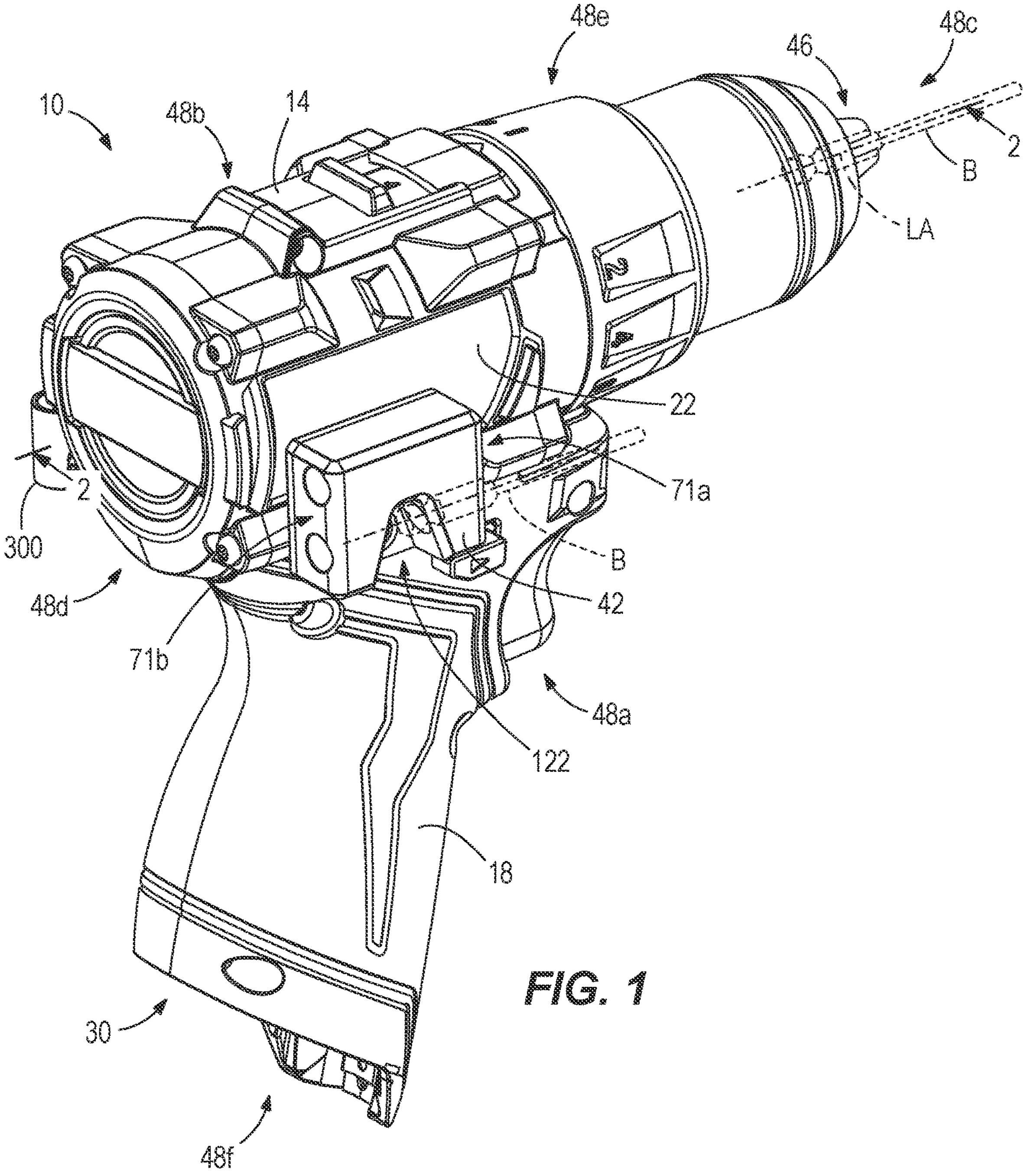
FIG. 1 is perspective view of a power tool and bit holder according to an embodiment of the disclosure.
Figure 2:
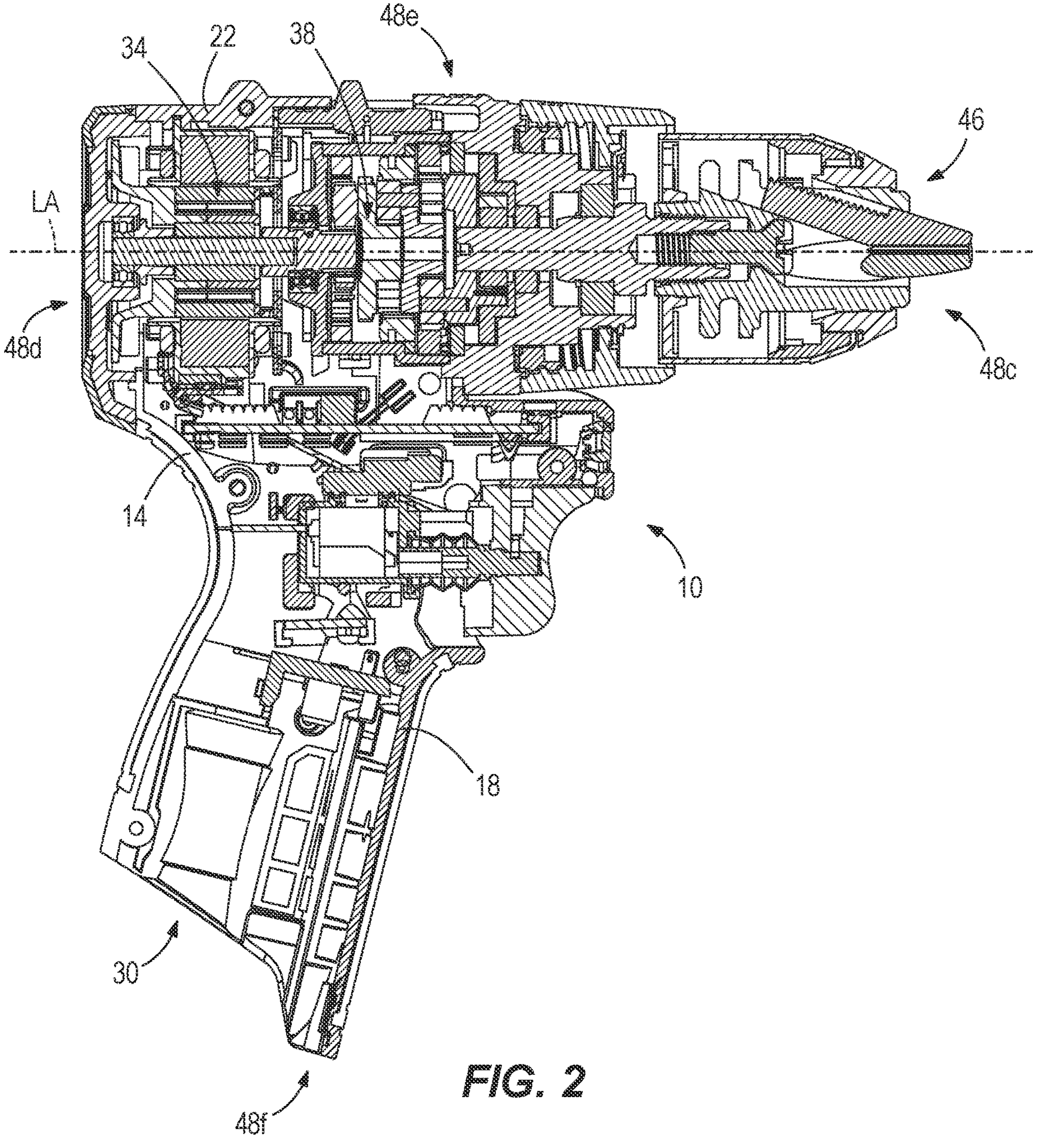
FIG. 2 is a cross-sectional view of the power tool of FIG. 1 taken along section line 2-2 in FIG. 1.

FIGS. 1 and 2 illustrate a power tool 10 in the form of a rotary tool, and, more specifically, a drill. The power tool 10 includes a housing 14 having a handle portion 18, a motor housing 22, and a battery receptacle 30 configured to receive a battery pack. In the illustrated embodiment, the battery receptacle 30 is located at a bottom end or foot of the handle portion 18 opposite the motor housing 22. The power tool 10 further includes a motor 34 (FIG. 2) supported in the motor housing 22 and a transmission 38 driven by the motor 34. As will be described in detail below, a bit holder 42 (i.e., an accessory) is configured to be attached to the power tool 10. The bit holder 42 is configured to secure tool bits B for use with the power tool 10 thereto. Various types of power tools 10 may be configured to engage the bit holder 42 with similar attachment mechanisms as described herein.

The battery receptacle 30 may be configured to engage and receive power from, for example, a 12 volt battery pack, an 18 volt battery pack, a 28 volt battery pack, a 40 volt battery pack, or a battery pack of any other voltage suitable for powering the power tool 10. In alternate embodiments, the power tool 10 may be powered by an external power source providing an AC current. The motor 34 receives power from the battery 26 to drive the transmission 38. The transmission 38 includes an output end 46 for transmitting torque to a workpiece. In the illustrated embodiment, the output end 46 may be configured as a chuck configured to receive torque from the transmission 38 and transmit torque to a tool such as a cutting bit B. In other embodiments, the output end 46 may transmit torque or other forces to another working bit. For example, and without limitation, the another working bit may be a fastening bit such as a screw driving bit or a socket bit configured to tighten or loosen a workpiece. The bit B may be decoupled to the output end 46 and coupled to the bit holder 42 for storage thereof. Optionally, the power tool 10 may be transported to another location with the bit secured to the bit holder 42. Accordingly, access to a plurality of bits, either coupled to the bit holder 42 or the output end 46 is permitted.

The power tool 10 includes a plurality of sides 48*a*-48*f* Specifically, the power tool includes a first side 48*a*, a second side 48*b*, a third side 48*c*, a fourth side 48*d*, a fifth side 48*e*, and a sixth side 48*f*. The first side 48*a* is a right side of the power tool 10. The second side 48*b* is a left side of the power tool 10. The third side 48*c* is a front side of the power tool 10. The fourth side 48*d* is a rear side of the power tool 10. The fifth side 48*e* is a top side of the power tool 10. The sixth side 48*f* is a bottom side of the power tool 10. The motor housing 22 extends along the longitudinal axis LA between the third side 48*c* and the fourth side 48*d*. The handle portion 18 extends from the motor housing 22 generally from the fifth side 48*e* to the sixth side 48*f*. The power tool 10 generally extends along a longitudinal axis LA (FIG. 1B) between the third side 48*c* and the fourth side 48*c*. As shown in FIG. 2, the motor 34, transmission 38, and output end 46 in the illustrated power tool 10 are generally aligned along the longitudinal axis LA. Other configurations are possible. The first side 48*a* extends between the third side 48*c* and the fourth side 48*d*. The second side 48*b* extends between the third side 48*c* and the fourth side 48*d* opposite the longitudinal axis L from the first side 48*a*.

Figure 3:
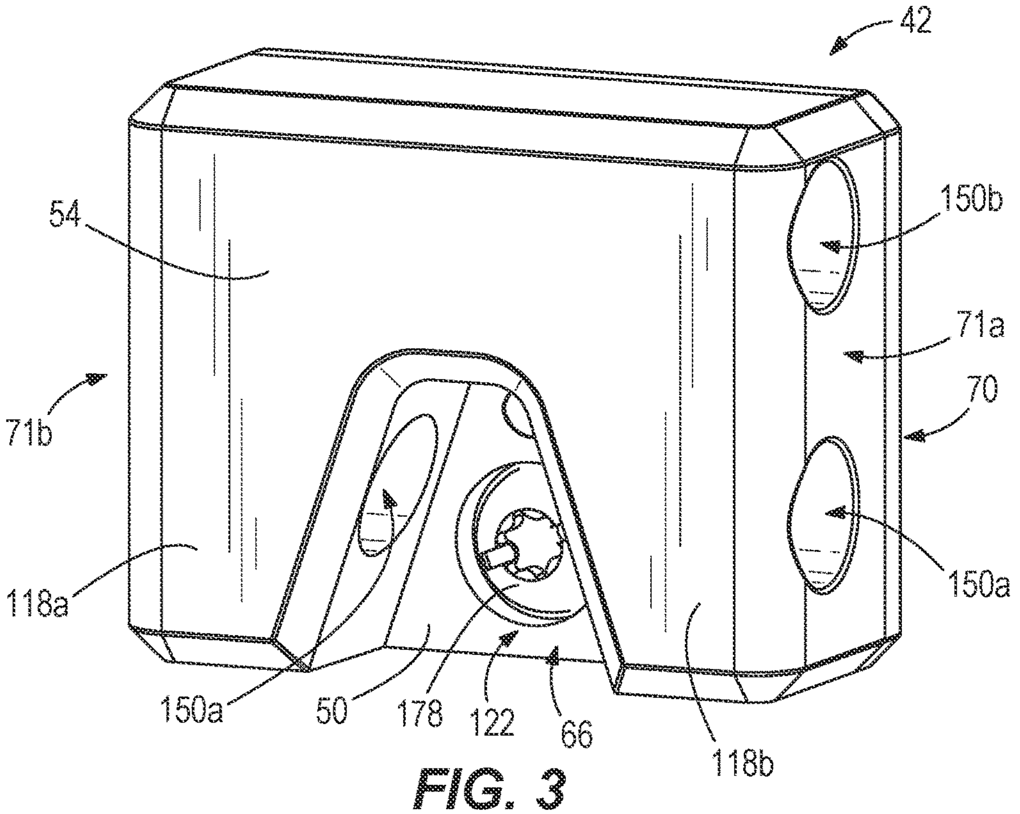
FIG. 3 is a front perspective view of the bit holder of FIG. 1.
Figure 4:
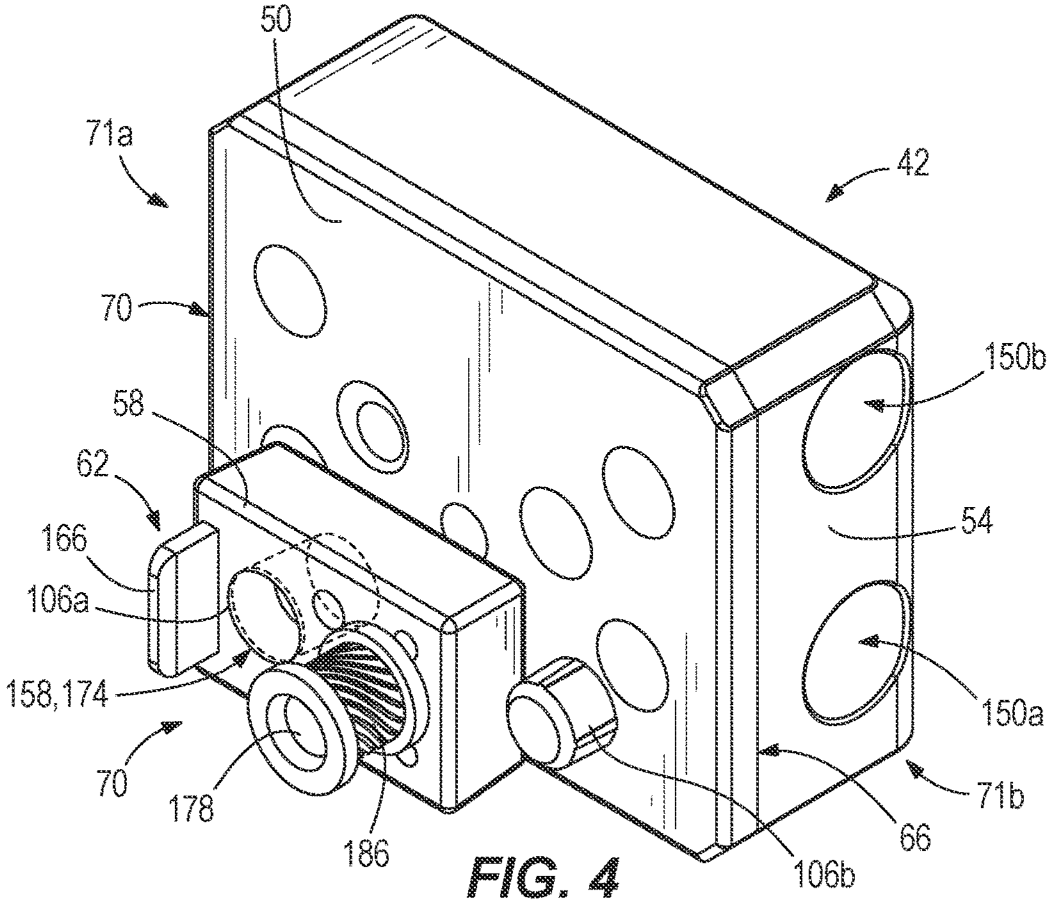
FIG. 4 is a rear perspective view of the bit holder and the adapter of FIG. 1A along with a fastener receiving bushing.

FIGS. 3 and 4 illustrate the bit holder 42. The bit holder 42 is configured to retain at least one tool bit B for transport therewith along with the power tool 10. The bit holder 42 is mountable to the power tool 10 (FIG. 1). As best illustrated in FIG. 1B, the bit holder 42 may be selectively mounted to either the first (i.e., right) side 48*a* or the second (i.e., left) side 48*b* of the power tool 10. As the bit holder 42 may be mounted to either the first (i.e., right) side 48*a* or the second (i.e., left) side of the power tool 10, the bit holder 42 may be described as being reversible. As illustrated in FIG. 4, the bit holder 42 includes a frame 50 and a bit holding portion 54. An adapter 58 is selectively coupled to the bit holder 42. The adapter 58 includes a coupling plate 62. The bit holding portion 54 is mounted to a first face 66 of the frame 50. The adapter 58 is mounted to a second face 70 of the frame 50. The coupling plate 62 and the adapter 58 are formed as two separate components which are integrally coupled to one another in the illustrated embodiment. Other embodiments where the adapter 58 and coupling plate 62 are formed as a single component or more than two components are possible. The bit holder 42 additionally includes a first end 71*a* and an opposite second end 71*b*.

Figure 1A:
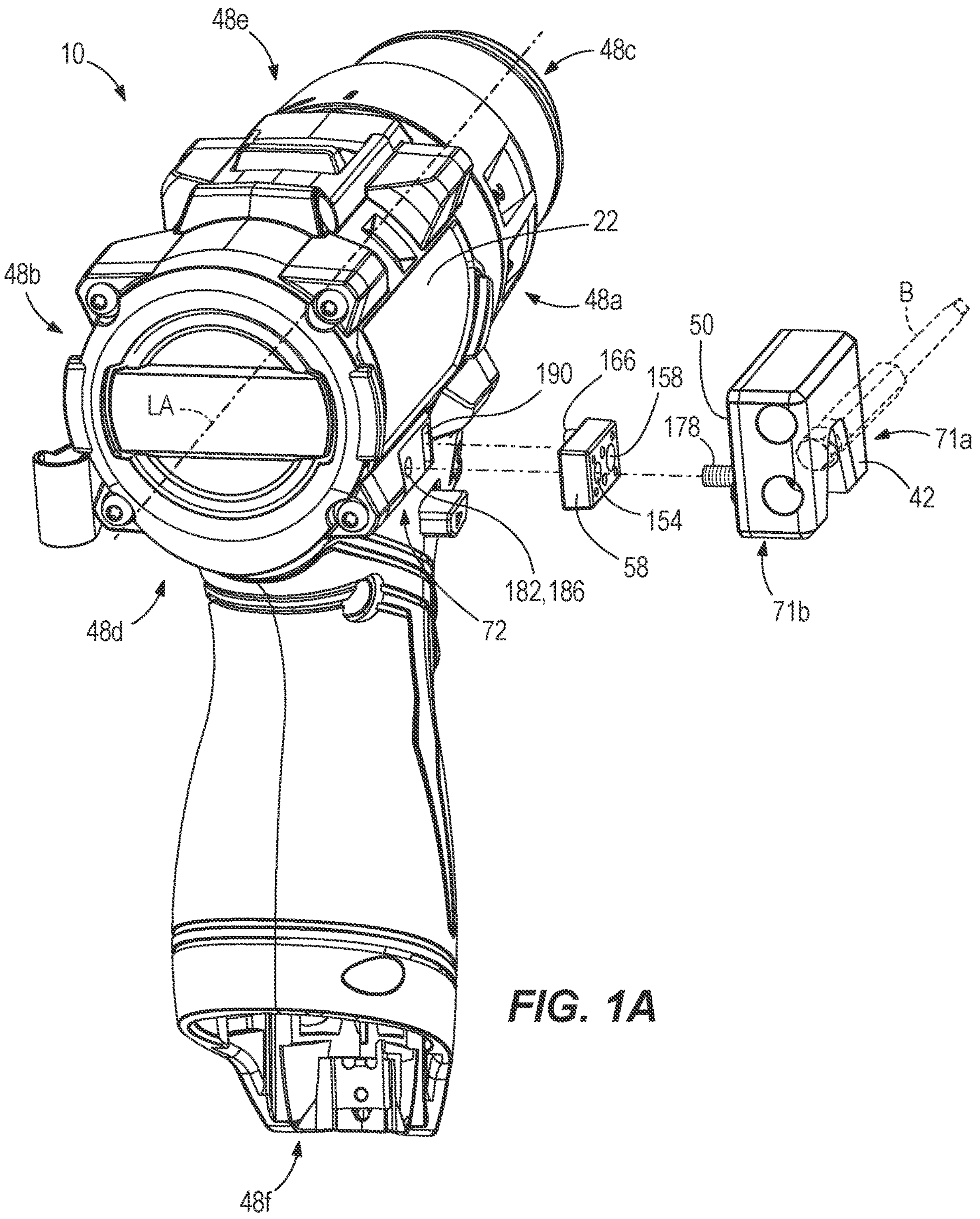
FIG. 1A is an exploded view of the power tool and bit holder of FIG. 1 along with an adapter.
Figure 1B:
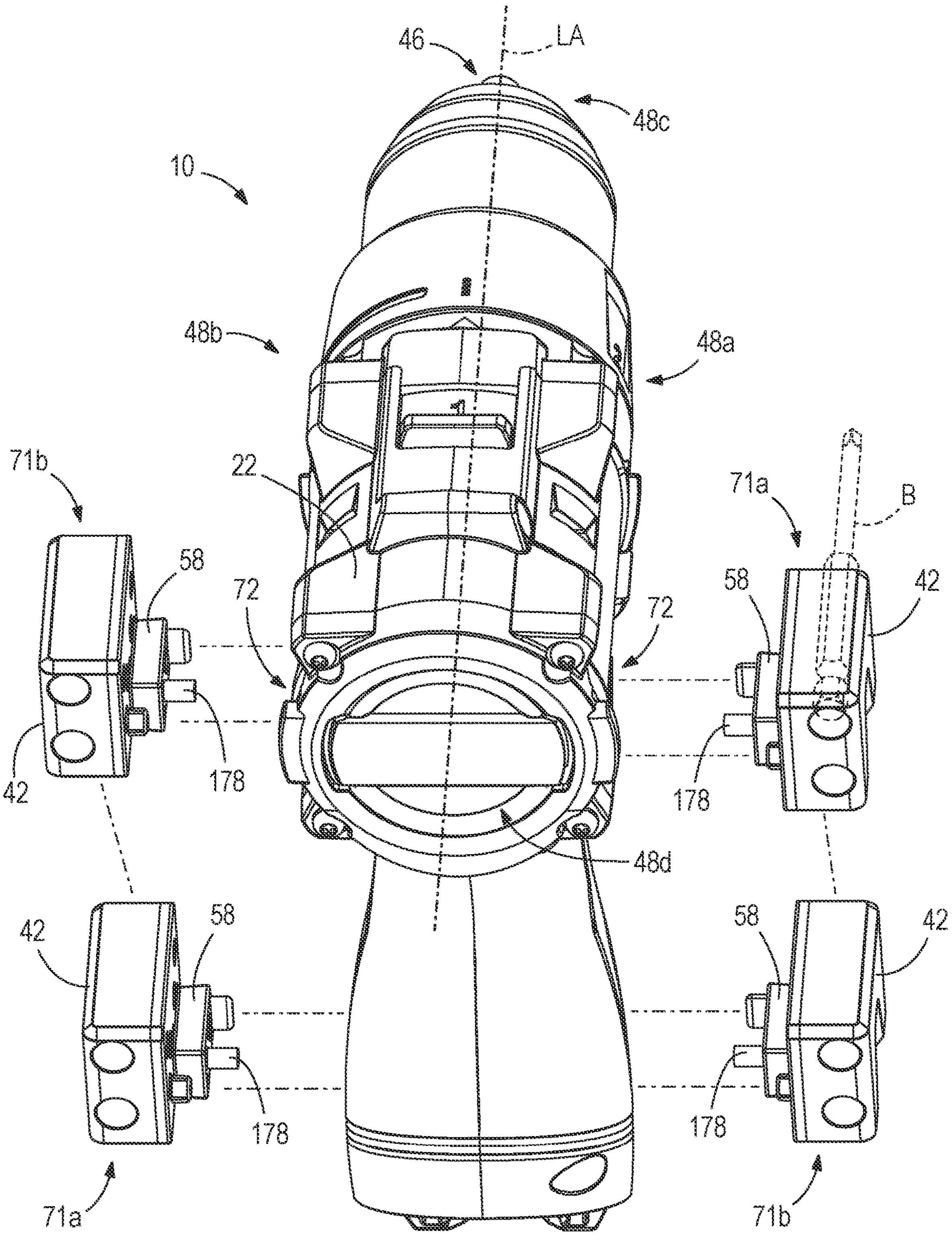
FIG. 1B is a schematic view of the power tool and bit holder of FIG. 1.

FIG. 1A illustrates the bit holder 42 removed from the power tool 10. The power tool 10 may receive the bit holder 42 at a mounting structure 72 located on the power tool 10. In the illustrated embodiment, the power tool 10 includes two mounting structures 72, each mounting structure 72 being located on one of the first side 48*a* and the second side 48*b* of the power tool 10. Only the mounting structure 72 adjacent the first side 48*a* is visible in FIG. 1A. In other embodiments, the power tool 10 may include more than two mounting structures 72. A mounting structure 72 may be located on any of the sides 48*a*-48*f* of the power tool 10. As illustrated in FIG. 1A, the bit holder 42 interfaces with the adapter 58 to couple the bit holder 42 to the mounting structure 72. In other embodiments, such as the embodiment of FIG. 14 described below, the frame 50 of the bit holder 42 may interface directly with a mounting structure 72 on the power tool 10.

As illustrated in FIG. 1B, the bit holder 42 is compatible to couple with each of the mounting structures 72 on the first side 48*a* and the second side 48*b* of the power tool 10. For example, when the bit holder 42 is coupled to the mounting structure 72 on the first side 48*a*, the adapter 58 is positioned between the bit holding portion 54 of the bit holder 42 and the power tool 10 on the first side 48*a* of the power tool 10. In this position, the first end 71*a* of the bit holder 42 generally faces the third side 48*c* of the power tool 10 and the second end 71*b* of the bit holder 42 generally faces the fourth side 48*d* of the power tool 10. To couple the bit holder 42 to the mounting structure 72 on the second side 48*b* of the power tool 10, the bit holder 42 may be removed from the mounting structure 72 on the first side 48*a*. The bit holder 42 is then moved to the second side 48*b* of the power tool 10 and flipped about the longitudinal axis LA of the power tool 10 such that the adapter 58 is positioned between the bit holding portion 54 and the power tool 10 on the second side 48*b* of the power tool 10. Once attached to the power tool 10, the second end 71*b* of the bit holder 42 generally faces the third side 48*c* of the power tool 10 and the first end 71*a* of the bit holder 42 generally faces the fourth side 48*d* of the power tool 10. In other words, once the bit holder 42 is attached to the opposing first or second side 48*a*, 48*b*, either end 71*a*, 71*b* of the bit holder 42 faces an opposing third or fourth side 48*c*, 48*d* of the power tool 10. The bit holder 42 may then be mounted to the mounting structure 72 on the second side 48*b* of the power tool 10, as will be described in further detail.

Figure 1C:
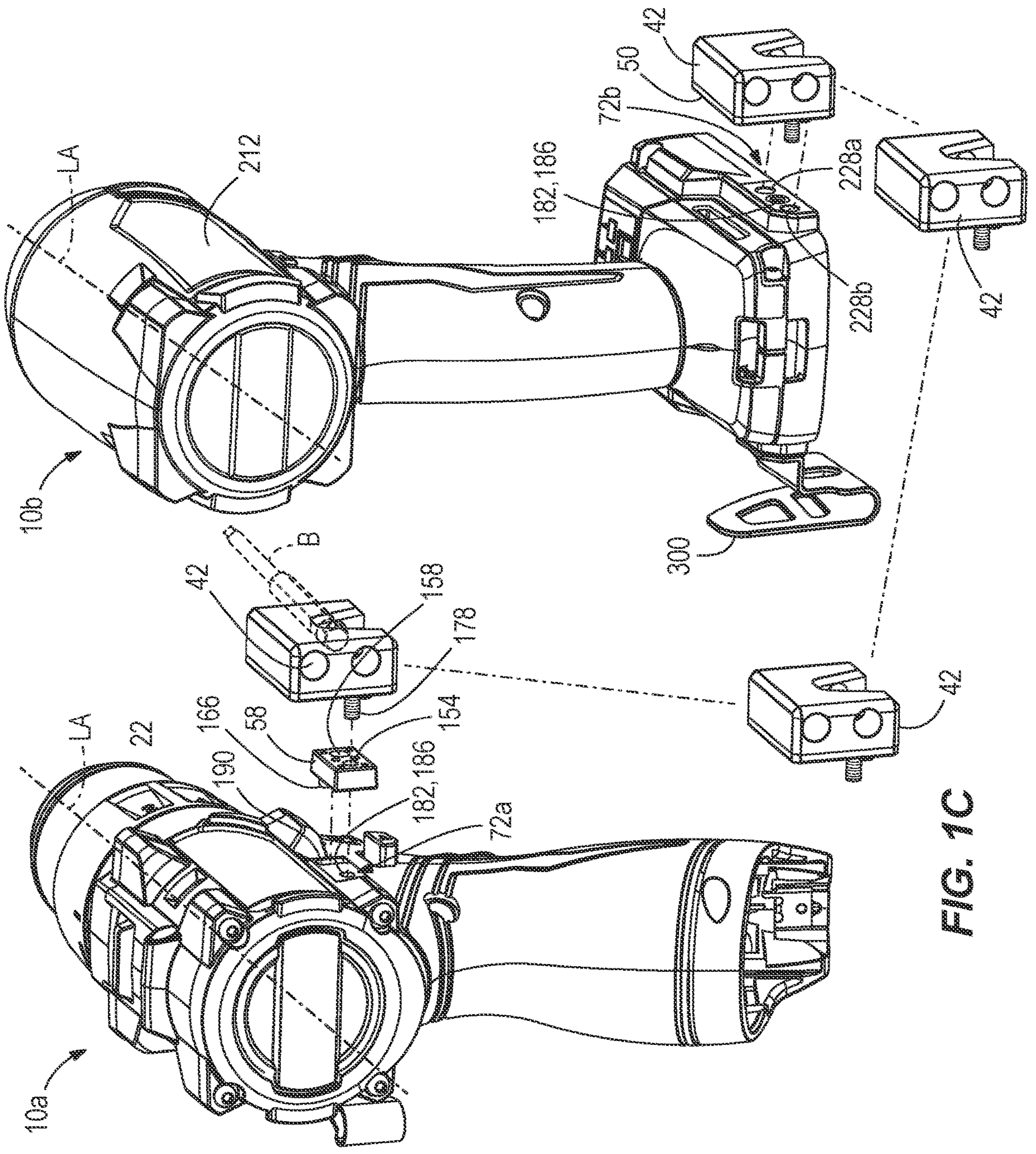
FIG. 1C is a schematic view of the power tool and bit holder of FIG. 1 along with a second power tool.

FIG. 1C illustrates a first tool 10*a*, the first tool 10*a* being substantially the same as the power tool 10 (e.g., the drill) illustrated in FIG. 1, and a second tool 10*b* (e.g., an impact driver or the like), and the bit holder 42. The first tool 10*a* includes a first mounting structure 72*a* that is compatible with the adapter 58. The second tool 10*b* includes a second mounting structure 72*b* that is compatible with the frame 50 of the bit holder 42. To couple the bit holder 42 to the first tool 10*a*, the bit holder 42 is interfaced with the adapter 58 such that the adapter 58 is positioned between the bit holding portion 54 and the first mounting structure 72*a*. To couple the bit holder 42 to the second tool 10*b*, the frame 50 of the bit holder 42 directly engages the second mounting structure 72*b* (i.e., without the adapter 58).

Figure 5:
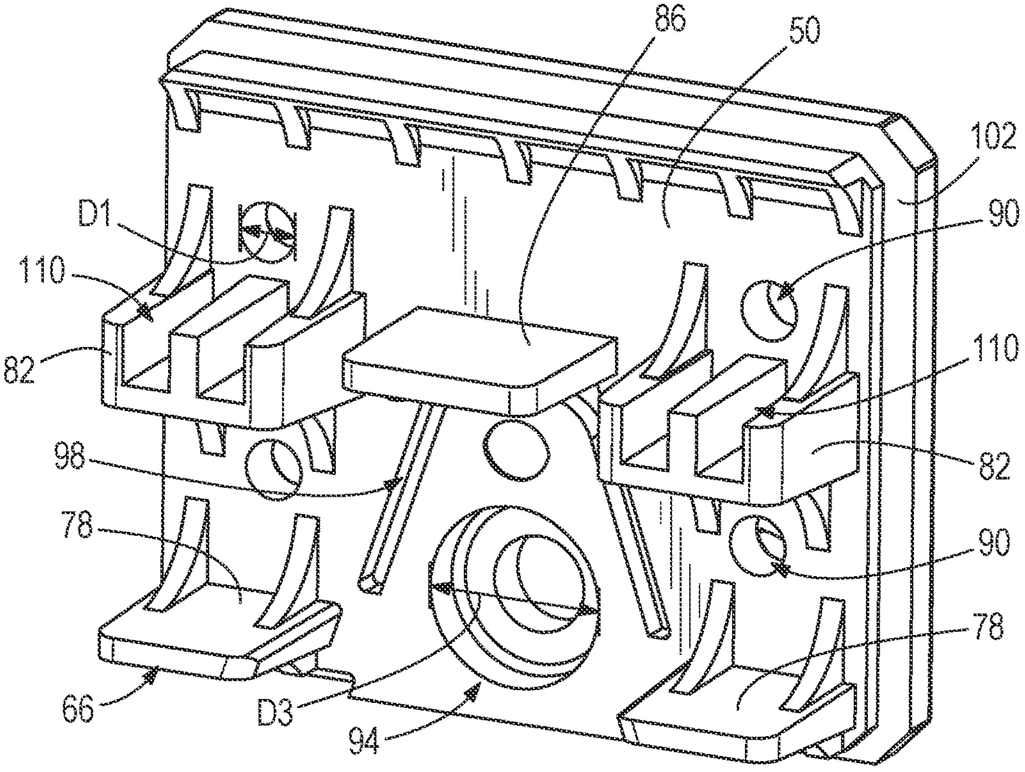
FIG. 5 is a front perspective view of a frame of the bit holder of FIG. 3.
Figure 6:
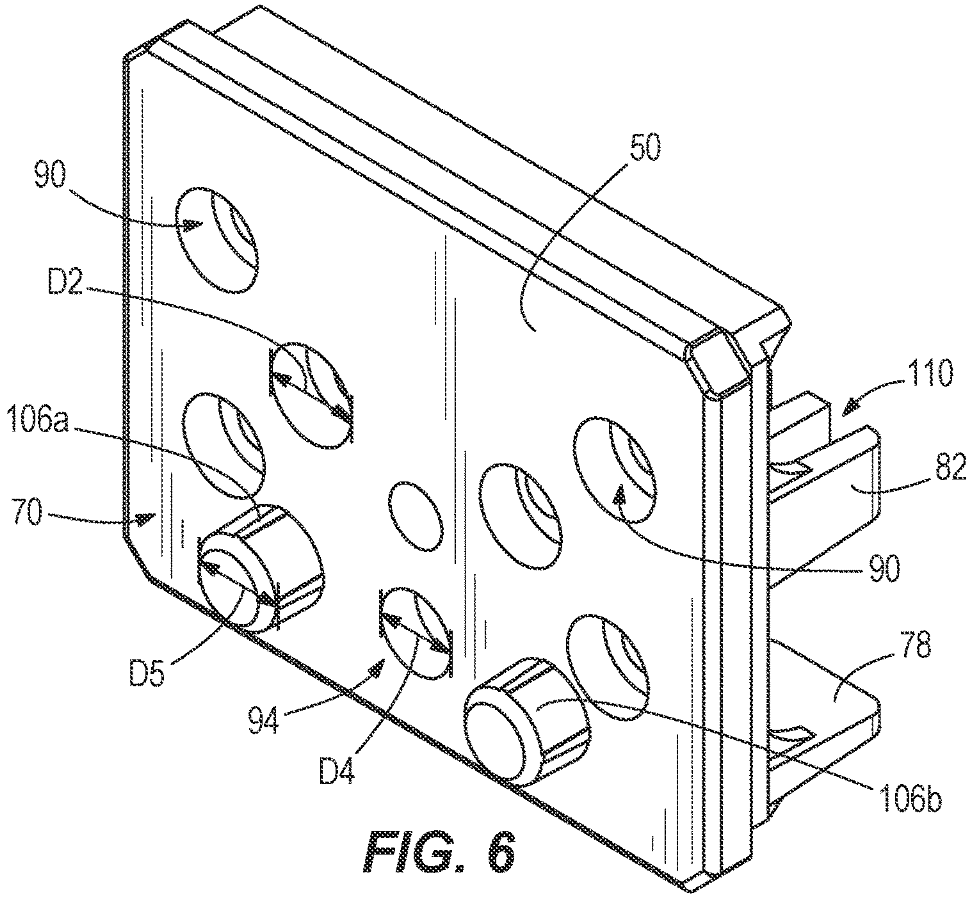
FIG. 6 is a rear perspective view of the frame of FIG. 5.

As illustrated in FIG. 5, in the illustrated embodiment, the frame 50 is formed of a generally rigid polymer. The first face 66 of the frame 50 includes lower mounting brackets 78, upper mounting brackets 82, a central tab bracket 86, a plurality of through holes 90, a fastener receiving hole 94, an arced groove 98, and a recessed outer periphery 102. As best illustrated in FIG. 6, the second face 70 of the frame 50 includes a plurality of mounting protrusions 106*a*, 106*b* projecting therefrom. With reference to FIGS. 5 and 6, each of the plurality of through holes 90 and the fastener receiving hole 94 extend from the first face 66 through the second face 70. The first face 66 of the frame 50 includes two lower mounting brackets 78 and two upper mounting brackets 82. The lower mounting brackets 78 are tabs projecting from the first face 66. The upper mounting brackets 82 are generally thicker than the lower mounting brackets 78 and include a plurality of channels 110 defined therein. The central tab bracket 86 is located between the two upper mounting brackets 82. The frame 50 includes six through holes 90. Each of the through holes 90 has a smaller diameter D1 (FIG. 5) at an opening on the first face 66 of the frame 74 than a diameter D2 (FIG. 6) at an opening on the second face 70 of the frame 50. The fastener receiving hole 94 is positioned between the lower mounting brackets 78. When the frame 50 and bit holding portion 54 are secured to one another (FIG. 3), an arch-shaped cavity 122 of the bit holding portion 54 is aligned with the fastener receiving hole 94 of the frame 50. This arrangement permits user access to the fastener 178 in the fastener receiving hole 94 through the arch-shaped cavity 122. The fastener receiving hole 94 has a larger diameter D3 at an opening on the first face 66 of the frame 50 than a diameter D4 at an opening on the second face 70 of the frame 50. In the illustrated embodiment, the plurality of mounting protrusions 106*a*, 106*b* positioned on the second face 70 of the frame 50 includes a first mounting protrusion 106*a* and a second mounting protrusion 106*b*. The first mounting protrusion 106*a* and the second mounting protrusion 106*b* are positioned on opposite sides of the fastener receiving hole 94 from each other. Each of the first mounting protrusion 106*a* and the second mounting protrusion 106*b* have a diameter D5.

Figure 7:
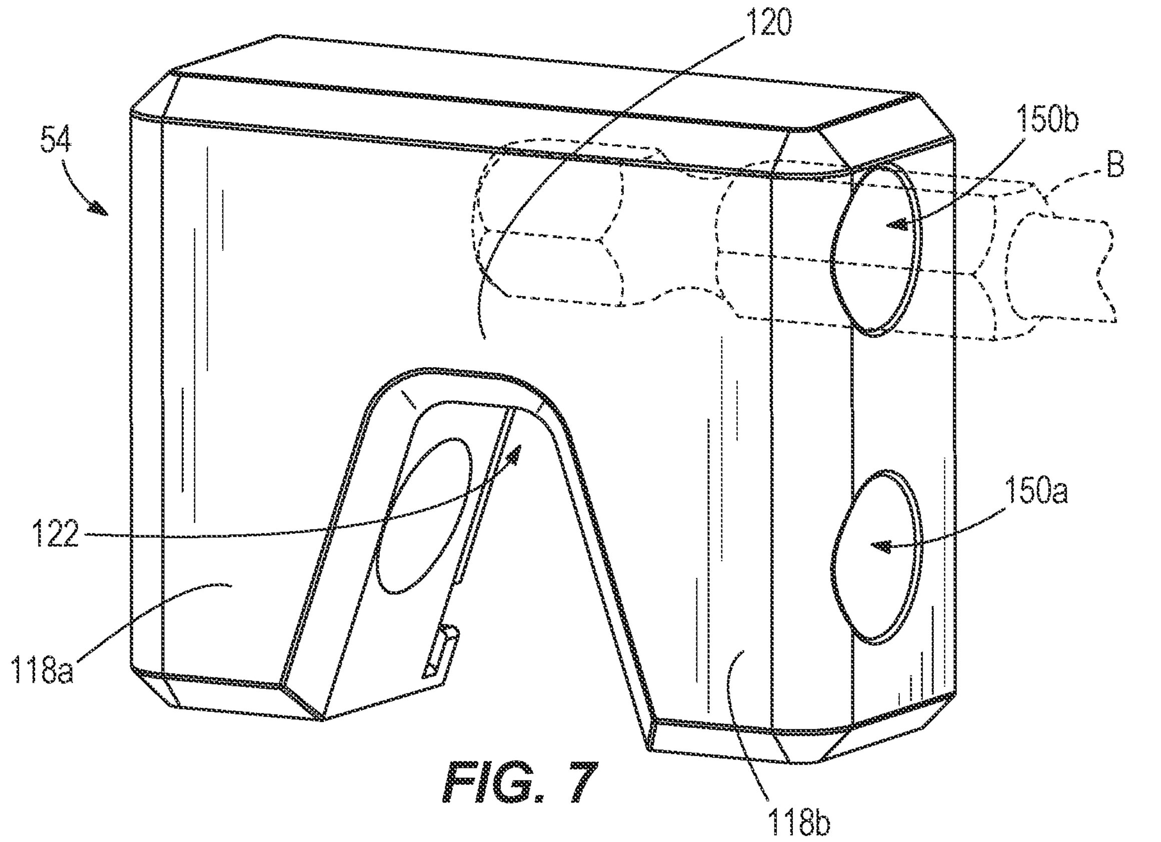
FIG. 7 is a front perspective view of a bit holding portion for the bit holder of FIG. 3.
Figure 8:
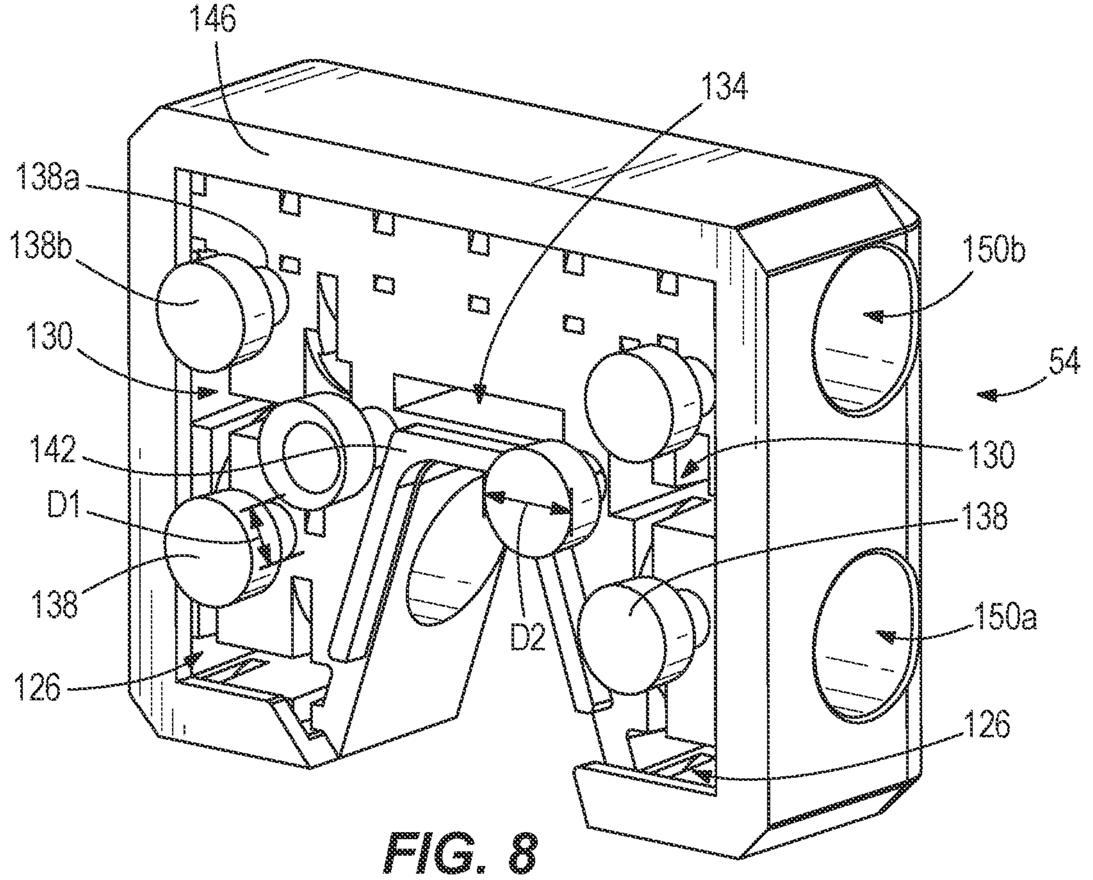
FIG. 8 is a rear perspective view of the bit holding portion of FIG. 7.

Now referring to FIGS. 7 and 8, the bit holding portion 54 is molded over the first face 66 of the frame 50 (FIG. 5). The bit holding portion 54 has two leg portions 118*a*, 118*b* (i.e., a first side and a second side) and an extending portion 120 (i.e., a span) extending between the leg portions 118*a*, 118*b*. The leg portions 118*a*, 118*b*, and the extending portion 120, in combination, define an arch-shaped cavity 122 in the bit holding portion 54. The cavity 122 is bounded by the leg portions 118*a*, 118*b* and the extending portion 120. As such, the bit holding portion 54 is generally arch-shaped. In the illustrated embodiment, the bit holding portion 54 is formed of an elastomeric material. The elastomeric material enables the bit holding portion 54 to flex relative to the frame 50 (FIG. 5). The bit holding portion 54 further includes lower mounting apertures 126, upper mounting apertures 130, a central mounting aperture 134, a plurality of molded protrusions 138, an arced protrusion 142, a protruding outer periphery 146, and a plurality of bit retaining apertures 150*a*, 150*b*.

In the illustrated embodiment, the bit holding portion 54 includes two lower mounting apertures 126 that are molded around the two lower mounting brackets 78 (FIG. 5) of the frame 50 and two upper mounting apertures 130 that are molded around the two upper mounting brackets 82 (FIG. 5) of the frame 50. The central mounting aperture 134 is molded around the central tab bracket 86 (FIG. 5). Each of the plurality of molded protrusions 138 is molded to fill a corresponding one of the plurality through holes 90 (FIG. 5). Specifically, each of the plurality of molded protrusions 138 includes a relatively small diameter portion 138*a* having a diameter corresponding to the diameter (i.e., first diameter) D1 and molded into one of the through holes 90 of the frame 50 (FIG. 5). Each of the plurality of molded protrusions 138 further includes a relatively large diameter portion 138*b* having a diameter corresponding to the diameter D2 (i.e., second diameter). The diameter D2 is nominally greater than the diameter D1 of the through holes 90. The large diameter portion 138*b* is molded into the opening in the second face 70 of the frame 50 (FIG. 6). The arced protrusion 142 is formed generally adjacent to the arch-shaped cavity 122. The arced protrusion 142 is molded into the arced groove 98 of the frame 50 (FIG. 6). The protruding outer periphery 146 is formed over the recessed outer periphery 102 of the frame 50 (FIG. 6). As such, each of the lower mounting apertures 126, the upper mounting apertures 130, the central mounting aperture 134, the plurality of molded protrusions 138, the arced protrusion 142, and the protruding outer periphery 146 is moldedly formed over or in a corresponding feature on the frame 50 (FIG. 6) to couple the bit holding portion 54 to the frame 50.

With continued reference to FIGS. 7 and 8, the bit holding portion 54 of the illustrated embodiment includes two bit retaining apertures 150*a*, 150*b*. Each of the bit retaining apertures 150*a*, 150*b* is formed through the bit holding portion 54. Each of the bit retaining apertures 150*a*, 150*b* extends along a direction that is perpendicular to an extension direction of the plurality of molded protrusions 138. Each of the bit retaining apertures 150*a*, 150*b* is configured to receive the bit B therein to couple the bit B to the power tool 10. A first bit retaining aperture 150*a* is positioned generally adjacent the lower mounting apertures 126 and extends through each of the leg portions 118*a*, 118*b* of the bit holding portion 54. A second bit retaining aperture 150*b* is positioned opposite the first bit retaining aperture 150*a* such that the upper mounting apertures 130 are positioned generally between the first bit retaining aperture 150*a* and the second bit retaining aperture 150*b*. Each of the first bit retaining aperture 150*a* and the second bit retaining aperture 150*b* is configured to retain a tool bit B as will be described in further detail below. In the illustrated embodiment, the bit retaining apertures 150*a*, 150*b* may extend from the first end 71*a* of the bit holder 42 to the second end 71*b* of the bit holder 42. In other words, the bit retaining apertures 150*a*, 150*b* may be in communication with the first end 71*a* and the second end 71*b* of the bit holding portion 54. In between the first end 71*a* and the second end 71*b*, the bit retaining aperture 150*a* is in communication with the arch-shaped cavity 122. Accordingly, a user may be permitted access to the bit B through the arch-shaped cavity 122 to eject the bit B from the bit retaining aperture 150*a*. The bit retaining aperture 150*a* is also divided into two discrete section such that relatively short tool bits do not become lost in the aperture 150*a*. Rather, with a relatively short tool bit, one end of the bit will always protrude from an end of one of the discrete sections of the bit retaining aperture 150*a*.

Returning to FIGS. 3 and 4, the frame 50 and the bit holding portion 54 are formed of different materials. In the illustrated embodiment, the frame 50 is formed of a generally rigid polymer such as, for example, PVC. The bit holding portion 54 is formed of a generally elastomeric material, such as, for example, rubber. In other embodiments, the frame 50 may be formed other materials such as nylon, glass nylon, or other similar plastics. In further embodiments, the frame 50 may be formed of a metal, such as steel, a ceramic, or any other suitable material.

Figure 9:
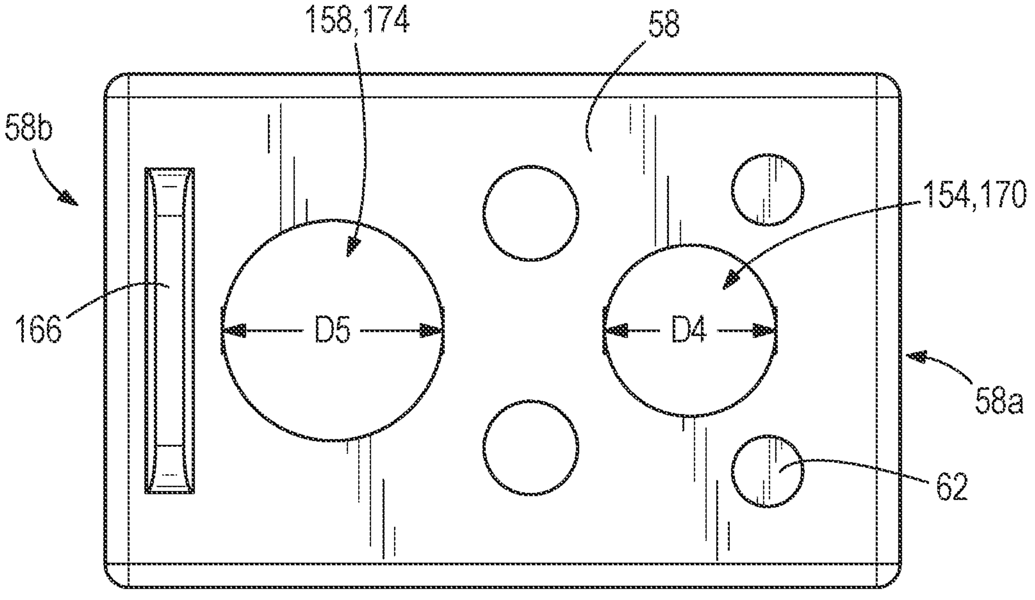
FIG. 9 is a front view of the adapter of FIG. 1A.
Figure 10:
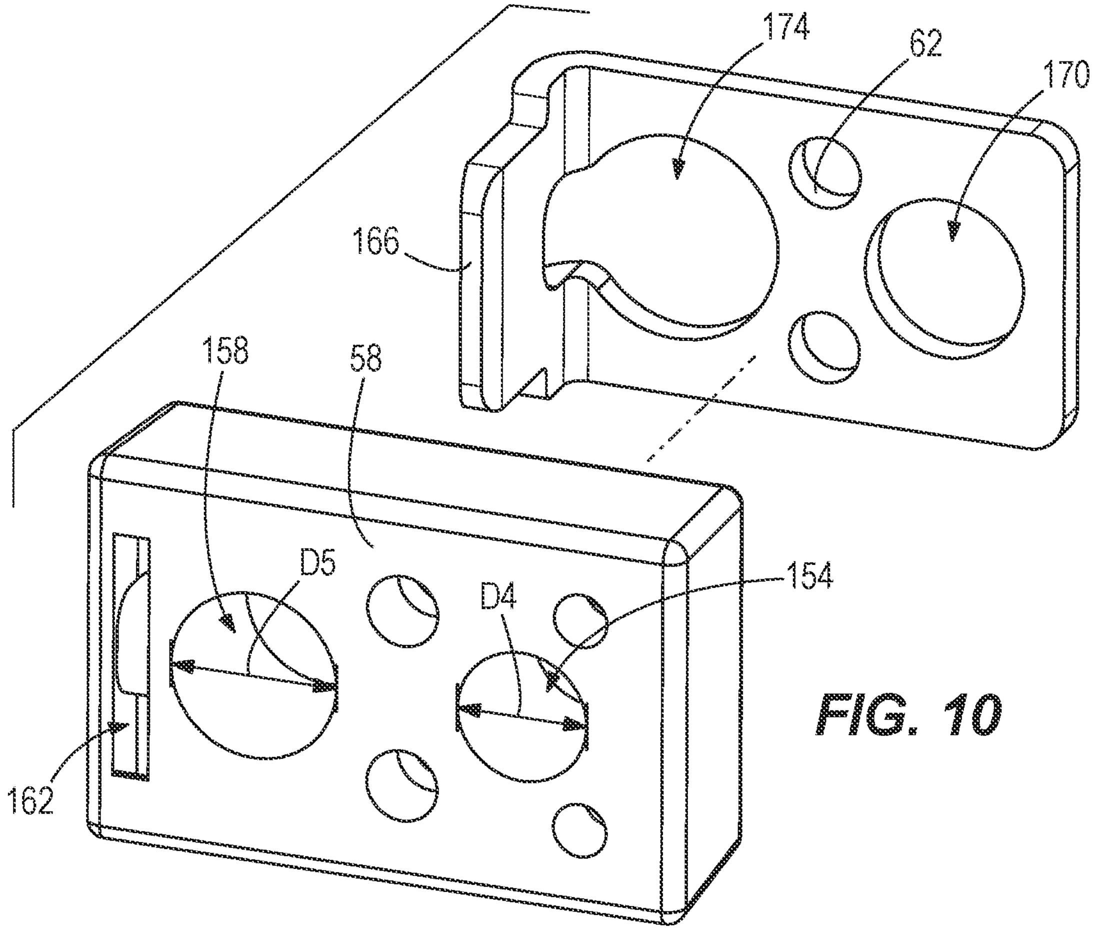
FIG. 10 is an exploded view of the adapter of FIG. 9.
Figure 11:
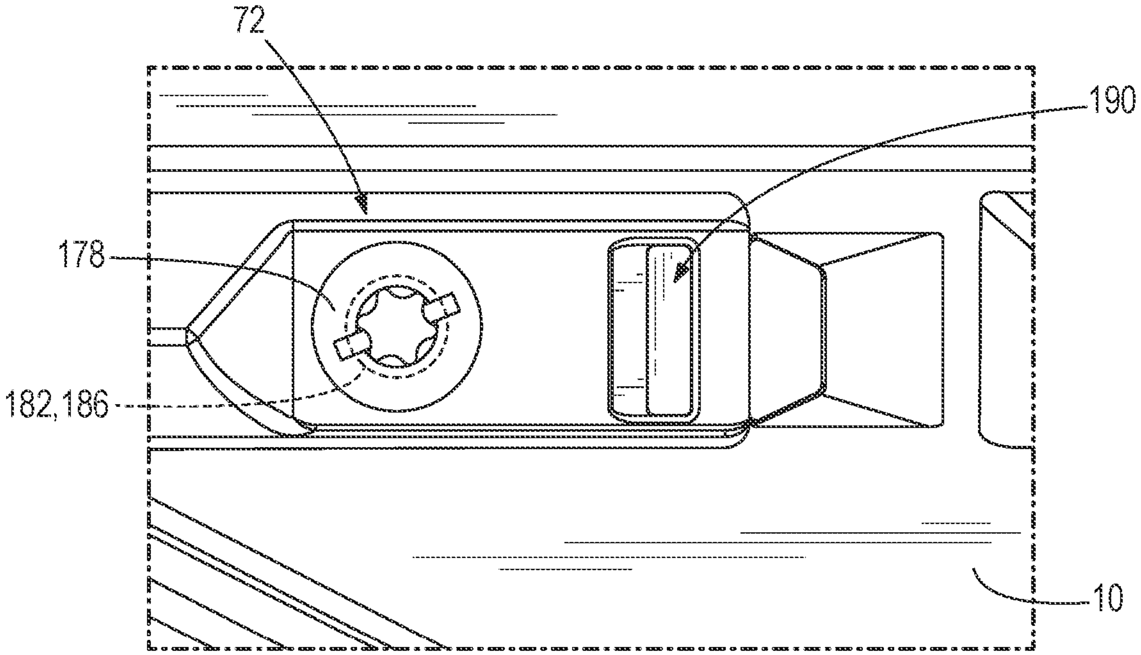
FIG. 11 is a first side view of a mounting structure for the power tool of FIG. 1.

FIGS. 9 and 10 illustrate the adapter 58 and the coupling plate 62. The adapter 58 includes a first end 58*a* and a second end 58*b*. The adapter 58 defines a first aperture 154, a second aperture 158, and an end slot 162. The first aperture 154 is positioned adjacent the first end 58*a*. The end slot 162 is positioned adjacent the second end 58*b*. The second aperture 158 is positioned between the end slot 162 and the first aperture 154. The coupling plate 62 includes a tab 166. The coupling plate 62 defines a first coupling plate aperture 170 and a second coupling plate aperture 174. The tab 166 protrudes from the end slot 162 of the adapter 58. The first coupling plate aperture 170 is positioned concentrically with the first aperture 154 of the adapter 58. The second coupling plate aperture 174 is positioned concentrically with the second aperture 158 of the adapter 58. The first aperture 154 of the adapter 58 and the first coupling plate aperture 170 are positioned concentrically with the fastener receiving hole 94 of the frame 50. The first aperture 154 of the adapter 58 and the first coupling plate aperture 170 are configured to receive the fastener 178 (FIG. 11). Specifically, the diameter D4 of each of the first aperture 154 and the first coupling plate aperture 170 is substantially equivalent to the diameter D4 at the opening in the second face 70 of the frame 50 (FIG. 6). The second aperture 158 of the adapter 58 and the second coupling plate aperture 174 are configured to receive, or mount to, one of the first mounting protrusion 106*a* and the second mounting protrusion 106*b*. The diameter D5 of each of the second aperture 158 and the second coupling plate aperture 174 is substantially equivalent to the diameter D5 of the mounting protrusions 106*a*, 106*b* such that the mounting protrusions 106*a*, 106*b* may snap fit to each of the second aperture 158 and the second coupling plate aperture 174.

Figure 12:
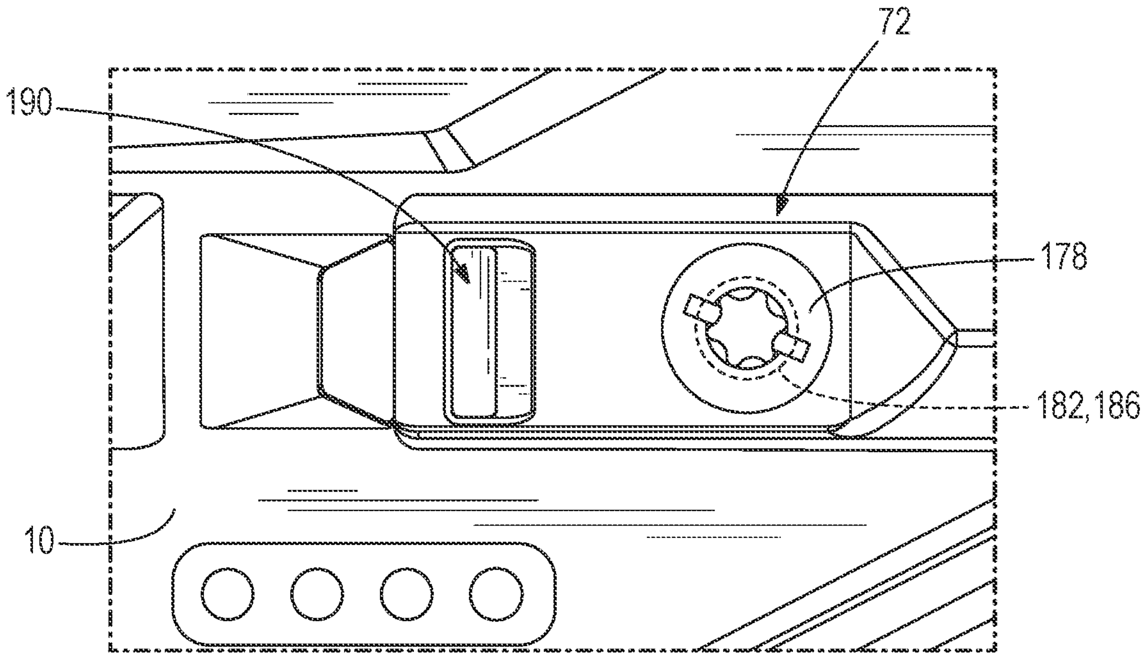
FIG. 12 is a second side view of the mounting structure for the power tool of FIG. 1.

As illustrated in FIGS. 11 and 12, the power tool 10 further includes the mounting structures 72 for receiving and coupling with the bit holder 42 (FIG. 3). Each mounting structure 72 includes an aperture 182 that receives the fastener 178, and a fastener receiving bushing 186 (FIG. 4) located in the aperture 182 configured to engage the fastener 178 to secure the bit holder 42 to the power tool 10. The fastener receiving bushing 186 is coupled to the power tool 10. The mounting structures 72*a* of the first tool 10*a* include a receiving slot 190. The receiving slot 190 is positioned between the fastener 178 and the output end 46 (FIG. 1) of the power tool 10. In the illustrated embodiment, the power tool 10 includes a right-side mounting structure 72, illustrated in FIG. 11, positioned on a right-hand side of the power tool 10 and a left-side mounting structure 72, illustrated in FIG. 12, positioned on a left-hand side of the power tool 10. With additional reference to FIG. 1, the bit holder 42 is reversible such that the bit holder 42 may be coupled to either of the right-side mounting structure 72 or the left-side mounting structure 72.

With reference to FIGS. 4 and 11, to couple the bit holder 42 to the right-side mounting structure 72, the adapter 58 of the bit holder 42 may be mounted to the frame 50 such that the second aperture 158 of the adapter 58 and the second coupling plate aperture 174 receive the first mounting protrusion 106*a* of the frame 50 (FIG. 6). By engaging the adapter 58 with the first mounting protrusion 106*a* (FIG. 6), the tab 166 of the coupling plate 62 is positioned adjacent the first side 71*a* of the bit holder 42. The fastener 178 may then be unfastened from the right-side mounting structure 72. For example, the fastener 178 may be a screw such that the fastener 178 is unscrewed from the right-side mounting structure 72. Once the fastener 178 is removed from the right-side mounting structure 72, the bit holder 42 may be placed into alignment with the right-side mounting structure 72*a* such that the tab 166 of the coupling plate 62 extends into the receiving slot 190. With additional reference to FIG. 6, with the tab 166 of the coupling plate 62 received in the receiving slot 190, the fastener receiving hole 94 of the frame 50, the first aperture 154 of the adapter 58 (FIG. 10), and the first coupling plate aperture 170 (FIG. 10) are each concentrically aligned with the fastener receiving bushing 186. The fastener 178 may then be re-inserted for engagement with the fastener receiving bushing 186 through the fastener receiving hole 94 of the frame 50, the first aperture 154 of the adapter 58 (FIG. 10), and the first coupling plate aperture 170 (FIG. 10) to couple the bit holder 42 to the power tool 10.

Turning to FIGS. 4 and 12, the bit holder 42 may be coupled to the left-side mounting structure 72 in a manner substantially similar as the right-side mounting structure 72 (FIG. 11), but with the adapter 58 engaging the mounting protrusion 180*b* of the frame 50. By engaging the adapter 58 with the second mounting protrusion 106*b*, the tab 166 of the coupling plate 62 is positioned at the second side 71*b* of the bit holder 42, rather than the first side 71*a*. As such, the bit holder 42 may be coupled to each of the first side 48*a* and the second side 48*b* of the power tool 10 without requiring additional components. Thus, the bit holder 42 is effectively formed as a reversible bit holder 42.

With reference to FIGS. 4 and 7, with the bit holder 42 coupled to one of the right-side mounting structure 72 (FIG. 11) and the left-side mounting structure 72 (FIG. 12), inactive tool bits B may be inserted into the first bit retaining aperture 150*a* and the second bit retaining aperture 150*b*. The elastomeric material of the bit holding portion 54 of the bit holding portion 54 provides friction so that inserted tool bits are inhibited from loosening from the bit holder 42. The first bit retaining aperture 150*a* may advantageously receive relatively small tool bits individually in one of the two leg portions 118*a*, 118*b*. The leg portions 118*a*, 118*b* having the first bit retaining aperture 150*a* in communication with the arch-shaped cavity 122 thus provide improved access to the bits B received in the first bit retaining aperture 150*a*. This effectively reduces the difficulty in removing relatively small tool bits B from the bit holder 42.

Figure 13:
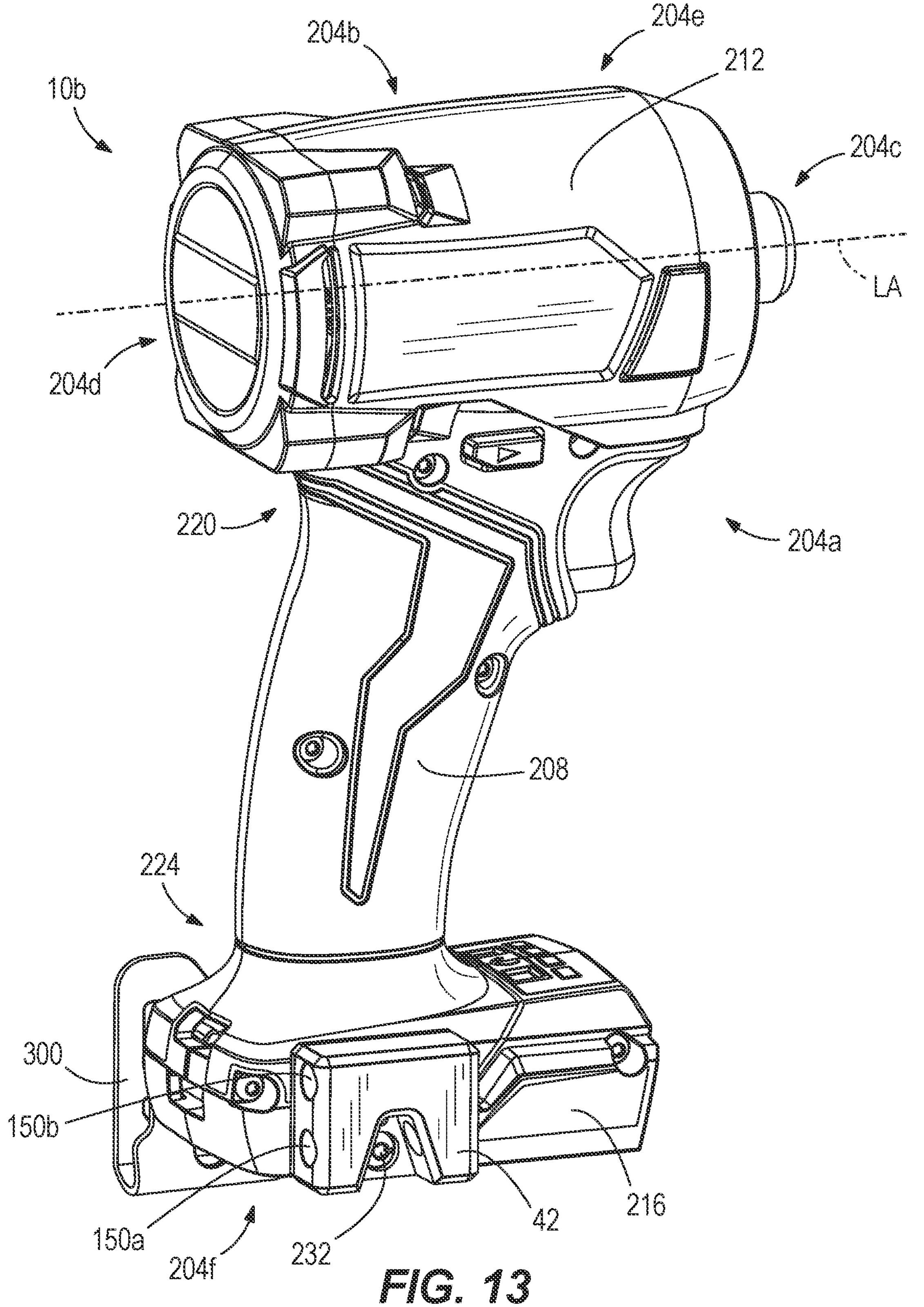
FIG. 13 is a perspective view of the second power tool of FIG. 1C.

FIG. 13 illustrates the power tool 10*b* of FIG. 1C in detail. The power tool 10*b* is substantially similar to the power tool 10*a* except for the differences described herein. The power tool 10*b* includes a first side 204*a*, a second side 204*b*, a third side 204*c*, a fourth side 204*d*, a fifth side 204*e*, and a sixth side 204*f* defined in generally the same orientation as the power tool 10. The power tool 10*b* further includes a handle portion 208, a motor housing portion 212, and a battery receptacle 216. The motor housing portion 212 extends generally along the longitudinal axis LA between the third side 204*c* and the fourth side 204*d*. The handle portion 208 extends from the motor housing portion 212 generally from the fifth side 204*e* to the sixth side 204*f* The handle portion 208 includes a proximal end 220 and a distal end 224. The proximal end 220 is located adjacent the motor housing portion 212. The distal end 224 is located opposite the proximal end 220 and adjacent the sixth side 204*f* of the power tool 10*b*. The battery receptacle 216 is positioned at the distal end 224 of the handle portion 218.

Figure 14:
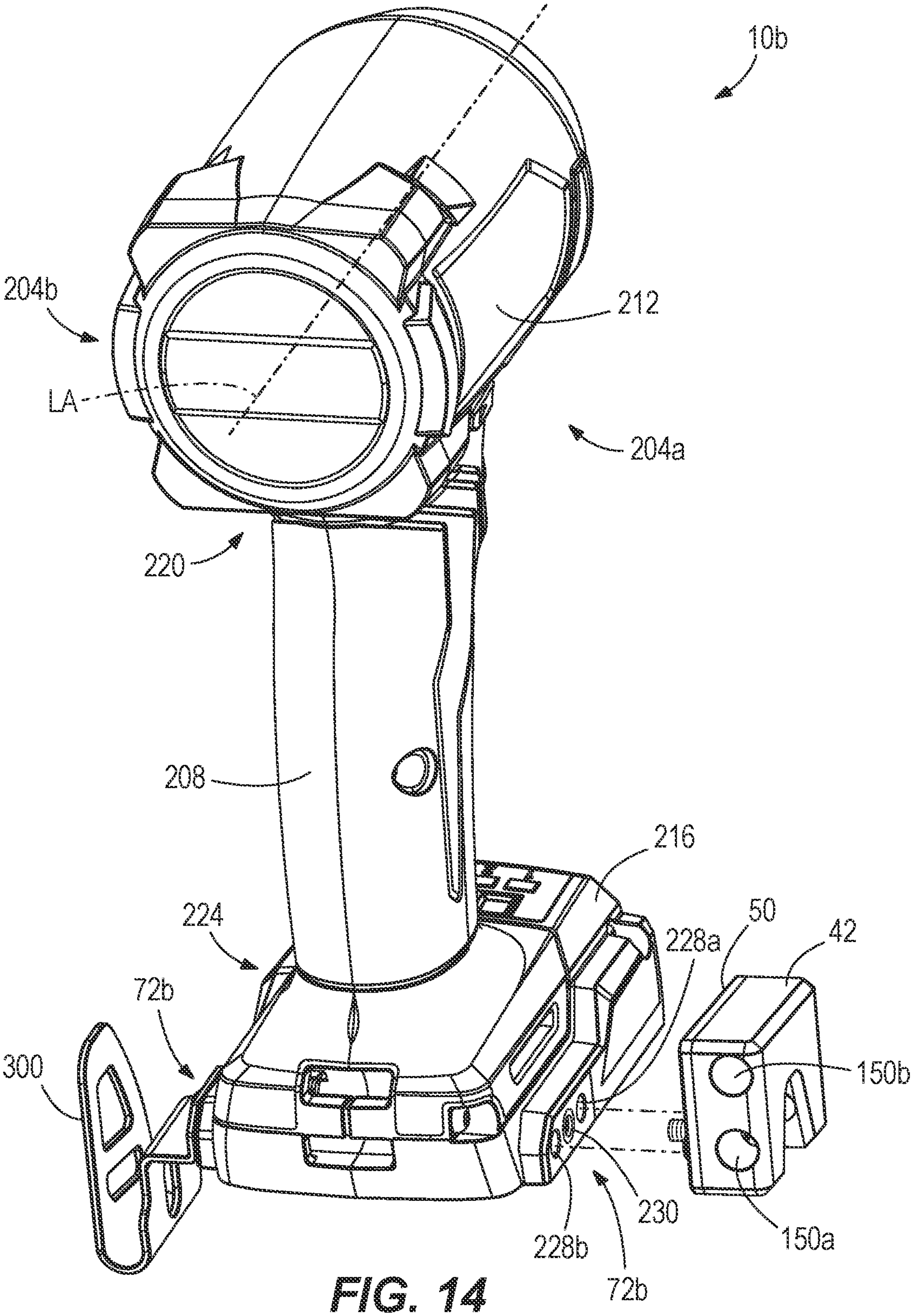
FIG. 14 is an exploded view of the second power tool and the bit holder of FIG. 1C.
Figure 15:
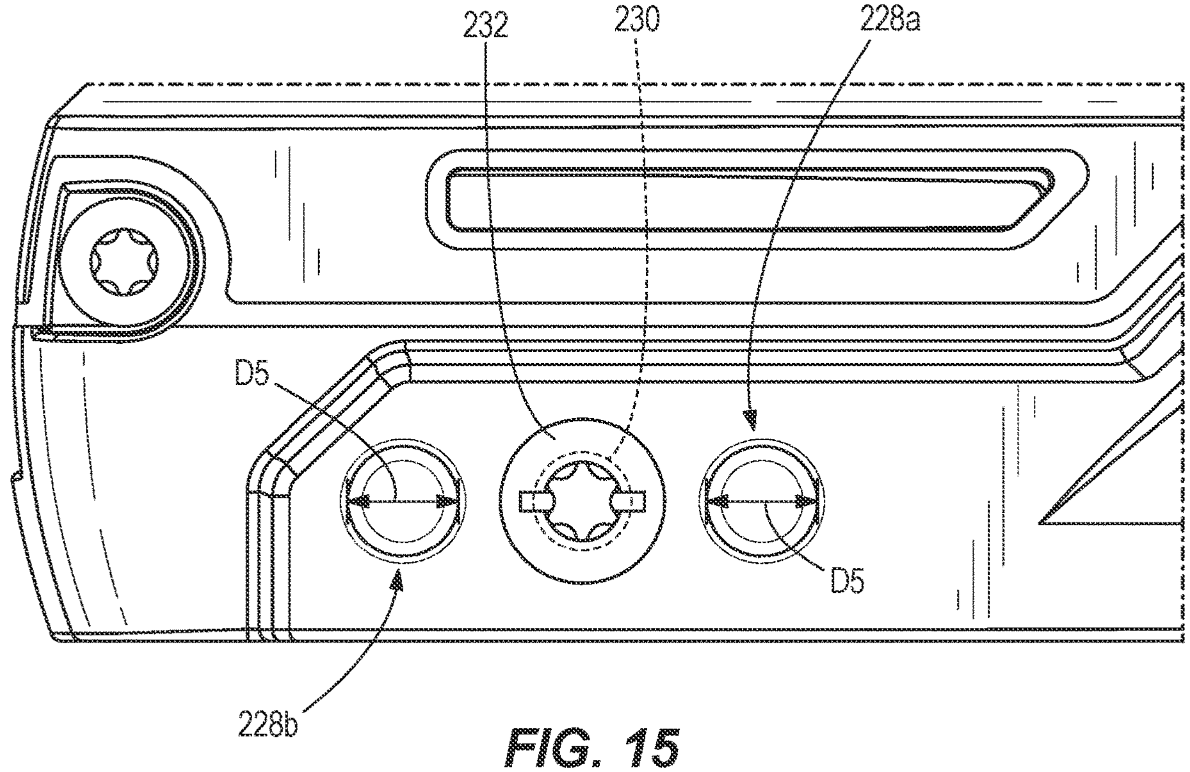
FIG. 15 is a side view of a mounting structure of the second power tool of FIG. 13.

As illustrated in FIGS. 14 and 15, the power tool 10*b* includes a mounting structure 72*b*, that is the second mounting structure 72*b* of FIG. 1C, positioned on the battery receptacle 216 at the distal end 224 of the handle portion 208. More specifically, the power tool 10*b* includes two mounting structures 72*b*. One mounting structure 72*b* is located on the first side 204*a*, and the other mounting structure 72*b* is located on the second side 204*b* opposite the first side 204*a*. Other positions, orientations, and numbers of mounting structures 72*b* on the power tool 10*b* are possible. Each mounting structure 72*b* is positioned adjacent the battery receptacle 216. The mounting structure 72*b* is configured to receive the bit holder 42. Specifically, the mounting structure 72*b* includes two protrusion receiving apertures 228*a*, 228*b*, a fastener receiving aperture 230, and a fastener 232 received in the fastener receiving aperture 230. The protrusion receiving apertures 228*a*, 228*b* have substantially the same diameter D5 as the mounting protrusions 106*a*, 106*b* of FIG. 4. Thus, the mounting protrusions 106*a*, 106*b* of FIG. 4 may be snap fit into the protrusion receiving apertures 228*a*, 228*b* such that the frame 50 of the bit holder 42 directly engages the mounting structure 72*b*. Further, the bit holder 42 is reversible between the mounting structures 72*b* on each of the first side 204*a* and the second side 204*b* of the power tool 10*b* as similarly described with respect to FIG. 1B.

During use with the power tool 10*a*, the tab 166 and the fastener 178 function as mounting elements to engage the mounting structure 72*a* of the power tool 10 and to secure the bit holder 42 to the power tool 10*a*. During use with the power tool 10*b*, the mounting protrusions 106*a*, 106*b* and the fastener 232 function as mounting elements to engage the mounting structure 72*b* of the power tool 10*b* and to secure the bit holder 42 to the power tool 10*b*. The fastener 178 is dimensioned to selectively couple the bit holder 42 to the power tool 10*b*. The fastener 232 is dimensioned to selectively couple the bit holder 42 and the adapter 58 to the power tool 10*a* with the adapter 58 sandwiched between the bit holder 42 and the power too 110*a*. The fastener 178 and the fastener 232 differ in length. More specifically, the fastener 178 is longer than the fastener 232, at least to account for the thickness of the adapter 58. In each embodiment, bits B are configured to engage the bit retaining apertures 150*a*, 150*b* to be secured to the corresponding power tool 10*a*, 10*b*.

As illustrated in FIGS. 1, 1C, 13, and 14, the power tool 10 may utilize the mounting structures 72 described herein to mount other articles to the power tool 10. For example, a belt clip 300 may be selectively mounted to the mounting structures 72. The belt clip 300 may be removed from the mounting structure 72 to accommodate the bit holder 42 or another article for coupling engagement with the power tool 10.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A bit holder configured to engage a power tool, the bit holder comprising:

a mounting element configured to alternately engage a first mounting structure on a first side of the power tool and a second mounting structure on a second side of the power tool;

a frame including a through hole and a fastener receiving hole configured to receive the mounting element; and a bit holding portion molded onto the frame, the bit holding portion including a molded protrusion molded to fill the through hole and a bit retaining aperture configured to at least partially receive a bit to secure the bit to the power tool.

2. The bit holder of claim 1, wherein the bit holding portion is arch-shaped and includes two leg portions and an extending portion extending between the leg portions to define a cavity in the bit holding portion.

3. The bit holder of claim 2, wherein the bit retaining aperture is in communication with the cavity.

4. The bit holder of claim 1, wherein the bit retaining aperture is in communication with a first end and a second end that is opposite the first end of the bit holding portion.

5. The bit holder of claim 1, wherein the mounting element includes a fastener that is alternately received in an aperture of the first mounting structure and an aperture of the second mounting structure.

6. The bit holder of claim 1, wherein the bit holding portion includes a cavity, and wherein the frame is secured to the bit holding portion with the fastener receiving hole of the frame aligned with the cavity of the bit holding portion.

7. The bit holder of claim 6, wherein the frame is made of a first material and the bit holding portion is made of an elastomeric material different than the first material.

8. The bit holder of claim 1, wherein the frame includes a plurality of through holes, and the bit holding portion includes a plurality of molded protrusions which engage the through holes of the frame.

9. The bit holder of claim 1, wherein the mounting element includes a mounting protrusion that is configured to alternately engage a protrusion receiving aperture of the first mounting structure and a protrusion receiving aperture of the second mounting structure by snap fit.

10. The bit holder of claim 9, wherein the mounting element also includes a second mounting protrusion that is configured to alternately engage a second protrusion receiving aperture of the first mounting structure and a second protrusion receiving aperture of the second mounting structure by snap fit.

11. The bit holder of claim 9, further comprising a fastener configured to alternately engage a fastener receiving aperture of the first mounting structure and a fastener receiving aperture of the second mounting structure.

12. The bit holder of claim 1, wherein the bit retaining aperture is a first bit retaining aperture, and wherein the bit holding portion includes a second bit retaining aperture configured to at least partially receive a second bit to secure the second bit to the power tool.

13. The bit holder of claim 1, wherein the bit retaining aperture is also configured to at least partially receive a second bit to secure the second bit to the power tool.

14. A bit holder assembly for use with a first power tool and a second power tool, the first power tool having a first mounting structure, the second power tool having a second mounting structure that is different than the first mounting structure, the bit holder assembly comprising:

a bit holder including a holder mounting element and a bit holding portion including a bit retaining aperture configured to at least partially receive a bit;

an adapter including an adapter mounting element and an aperture, a first threaded fastener configured to selectively couple the bit holder with the first mounting structure; and a second threaded fastener configured to selectively couple the bit holder and the adapter with the second mounting structure;

wherein the bit holder is configured to be removably coupled to the first power tool by the first threaded fastener and with the holder mounting element in engagement with the first mounting structure, and wherein the bit holder is configured to be removably coupled to the second power tool by the second threaded fastener and with the holder mounting element in engagement with the aperture and the adapter mounting element in engagement with the second mounting structure.

15. The bit holder assembly of claim 14, wherein the adapter mounting element includes a tab configured to engage a receiving slot of the second mounting structure.

16. The bit holder assembly of claim 14, wherein the bit holder is configured to be removably coupled to any one of a first side of the first power tool, a second side of the first power tool, a first side of the second power tool, and a second side of the second power tool, the first side and the second side of the first power tool opposing one another, and the first side and the second side of the second side of the second power tool opposing one another.

17. The bit holder assembly of claim 16, wherein the second threaded fastener is configured to selectively removably couple the bit holder with the second power tool with the adapter sandwiched between the bit holder and the second power tool, and wherein the first threaded fastener and the second threaded fastener differ in length.

* * * * *